(12) United States Patent
Nakamura

(10) Patent No.: US 6,360,683 B1
(45) Date of Patent: Mar. 26, 2002

(54) HOUSING OF VEHICULAR SHIFT LEVER

(75) Inventor: Toshiyuki Nakamura, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/480,659

(22) Filed: Jan. 11, 2000

(30) Foreign Application Priority Data

Jan. 27, 1999 (JP) .......................................... 11-017794

(51) Int. Cl.⁷ .............................. G01D 11/00; G09F 9/00
(52) U.S. Cl. ...................... 116/28.1; 116/321; 116/322; 116/DIG. 20
(58) Field of Search ........................ 116/28.1, DIG. 20, 116/321, 322

(56) References Cited

U.S. PATENT DOCUMENTS

| | | | |
|---|---|---|---|
| 3,897,747 A | | 8/1975 | Biazzo .......................... 116/36 |
| 3,985,095 A | * | 10/1976 | Nurse .................. 116/DIG. 20 |
| 4,446,809 A | | 5/1984 | Dennis ...................... 116/28.1 |
| 4,980,803 A | | 12/1990 | Richmond et al. ............ 362/23 |
| 5,512,875 A | * | 4/1996 | Polityka ..................... 116/28.1 |
| 5,582,073 A | * | 12/1996 | Takeuchi et al. ........... 116/28.1 |
| 5,701,838 A | * | 12/1997 | Ito et al. ..................... 116/28.1 |
| 6,044,790 A | * | 4/2000 | Murakami .................. 116/28.1 |
| 6,082,286 A | * | 7/2000 | Kovach et al. ............. 116/28.1 |

FOREIGN PATENT DOCUMENTS

| | | |
|---|---|---|
| JP | 08-137569 | 5/1996 |
| JP | 8-282319 | 10/1996 |
| JP | 2556705 | 8/1997 |

\* cited by examiner

*Primary Examiner*—Diego Gutierrez
*Assistant Examiner*—Yaritza Guadalupe
(74) *Attorney, Agent, or Firm*—Foley & Lardner

(57) ABSTRACT

A housing of a vehicular shift lever according to the present invention has a) a plate having characters for denoting position of the vehicular shift lever, the plate having a first side that is substantially in parallel with a direction of movement of the vehicular shift lever; b) a receiving portion for receiving therein the plate, the receiving portion being configured such that, when the plate is received in the receiving portion, the plate is mounted on an inner surface of the housing; and c) a first supporting portion for supporting thereon the first side of the plate, the first supporting portion being formed of a plurality of first projections arranged on a first side of the receiving portion, the first side of the receiving portion being substantially in parallel with the direction of movement of the vehicular shift lever. In this housing, the plate has on the first side thereof a plurality of first cut-outs, each first cut-out having a size relative to a respective one of the first projections of the receiving portion such that at least a part of each first cut-out is allowed to be occupied by at least a part of the respective one of the first projections when each first cut-out is mated with the respective one of the first projections in order to bring the plate into the receiving portion. With this, the plate can be easily mounted on the housing.

7 Claims, 5 Drawing Sheets

HOUSING OF VEHICULAR SHIFT LEVER

BACKGROUND OF THE INVENTION

1. Field of the Invention

The present invention relates to a housing of an automatic shift lever device of a vehicle, which housing has a plate for indicating the position of the shift lever by characters such as "P", "R", "N", "D", "2" and "1". The plate is mounted on the housing to be in parallel with the direction of movement of the automatic shift lever.

2. Description of the Prior Art

In general, an automatic shift lever device of a vehicle has an automatic shift lever that moves in the fore-and-aft direction of the vehicle. This manner of movement of the automatic shift lever is different from that of a manual shift lever. It is necessary for the automatic shift lever device to clearly indicate the position of the shift lever. Therefore, the automatic shift lever device is equipped with a plate in the following manner: An automatic shift lever device proper is housed in a housing which has an elongate opening. The shift lever projects upwardly through the elongate opening and can make a linear movement in the elongate opening. In addition, the housing has a window or opening which is elongate in shape. A plate for indicating characters such as "P", "R", "N", "D", "2" and "1" is secured to the window, which characters are made through printing or the like. A lighting system is provided below the window of the housing. This lighting system helps achieve bright and clear characters of the plate. Generally, the plate is thin, transparent and rectangular. Moreover, being made of plastics or the like, the plate is flexible.

The housing has a pair of rails on an inside surface thereof. In assembly of the housing, the plate is inserted into the rails by sliding both longitudinal sides of the plate along the rails. After this sliding movement to a predetermined position, the plate is opposed to the window. In fact, the characters of the plate are exposed through the window. Depending on the configuration of the housing, it may become necessary to sharply bend the plate in order to insert the longitudinal side edges of the plate into the rails of the housing. This insertion may not be an easy operation and may cause scratches or cracks on the surface of the plate.

SUMMARY OF THE INVENTION

It is, therefore, an object of the present invention to provide a shift lever housing having a plate for denoting the shift lever position, which plate is easily to be mounted on the housing, thus achieving a good assembly work.

There is provided a housing of a vehicular shift lever, according to the present invention. This housing comprises a) a plate having characters for denoting position of the vehicular shift lever, the plate having a first side that is substantially in parallel with a direction of movement of the vehicular shift lever; b) a receiving portion for receiving therein the plate, the receiving portion being configured such that, when the plate is received in the receiving portion, the plate is mounted on an inner surface of the housing; and c) a first supporting portion for supporting thereon the first side of the plate, the first supporting portion being formed of a plurality of first projections arranged on a first side of the receiving portion, the first side of the receiving portion being substantially in parallel with the direction of movement of the vehicular shift lever. In this housing, the plate has on the first side thereof a plurality of first cut-outs, each first cut-out having a size relative to a respective one of the first projections of the receiving portion such that at least a part of each first cut-out is allowed to be occupied by at least a part of the respective one of the first projections when each first cut-out is mated with the respective one of the first projections in order to bring the plate into the receiving portion.

DESCRIPTION OF THE PREFERRED EMBODIMENTS

Referring to FIGS. 1 through 7, there is provided a housing 2 of an automatic shift lever (not shown) of a vehicle, according to a preferred embodiment of the present invention.

Figure 1:
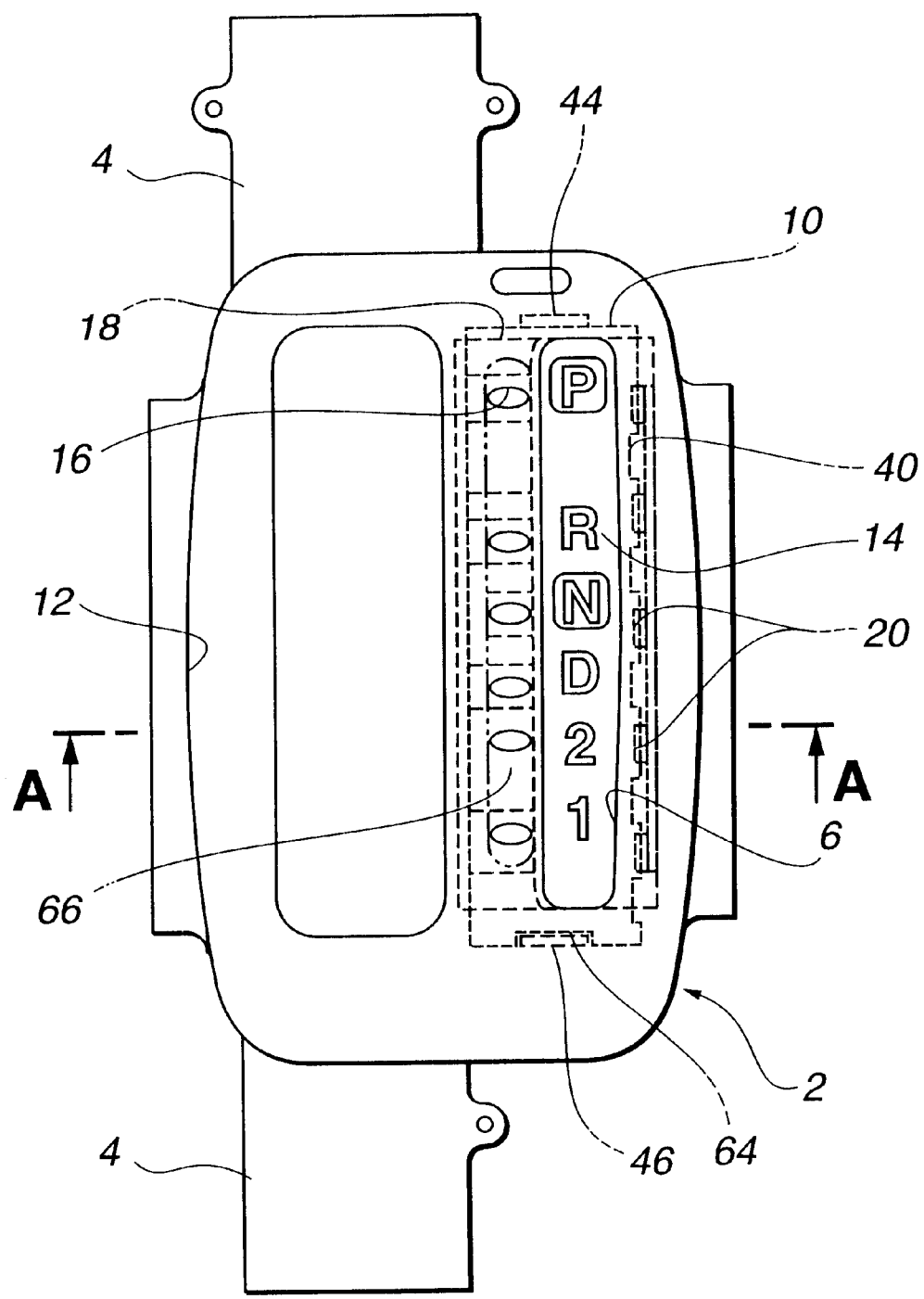
FIG. 1 is a plan view of a housing of an automatic shift lever device, according to a preferred embodiment of the present invention.

As is seen in FIG. 1, a housing 2 has on a top surface thereof an opening 12 which is elongate in shape. The automatic shift lever (not shown) can make a linear movement within the opening 12 together with a slide plate (not shown). This slide plate (not shown) is so provided that no foreign objects enter into the opening. A window 6 is formed in parallel with the opening 12. This window 6 is also elongate in shape, and is almost as long as the opening 12. As is seen from FIGS. 1–3, a guide 4 extends from a major portion of the housing 2, for guiding the slide plate (not shown).

Figure 5:
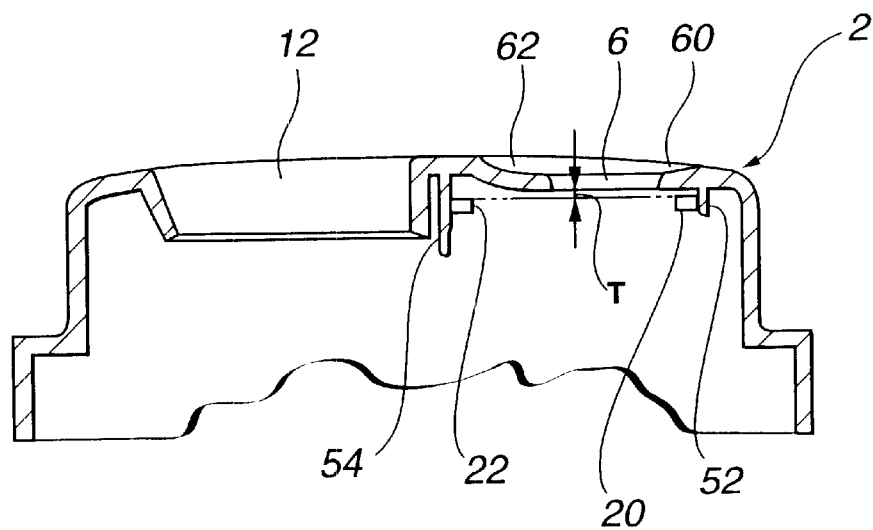
FIG. 5 is an enlarged cross section taken along lines A—A in FIG. 1.
Figure 6:
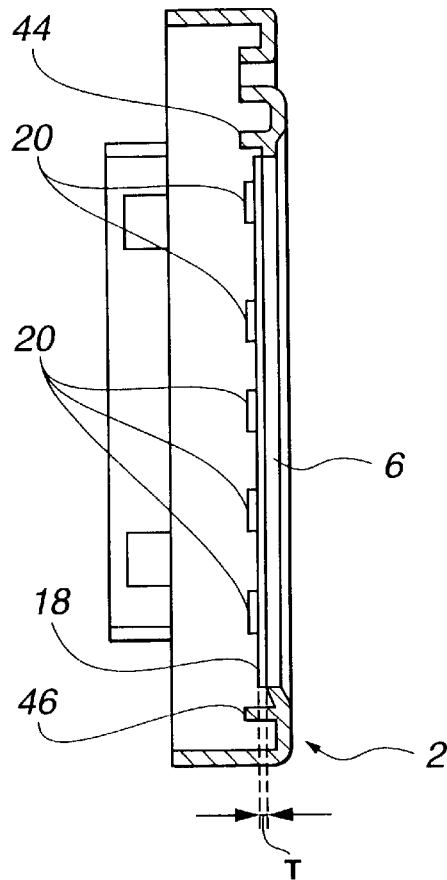
FIG. 6 is a cross section taken along lines B—B in FIG. 2.

In the window 6, there is provided a plate 10 having characters 14 printed thereon, which characters 14 are "P", "R", "N", "D", "2" and "1". The plate 10 is received in a receiving portion 18 of the housing 2. The receiving portion 18 can be defined as being a part of the housing 2. In fact, as shown in FIGS. 5 and 6, this part of the housing 2 is defined or configured as having (1) first and second ceilings 60 and 62 having the window (opening) 6 for exposing the characters 14 of the plate 10, (2) first and second side walls 52 and 54 each extending downward from the first and second ceilings 60 and 62, (3) first supporting portion 20 and second supporting portion 22, respectively extending inwardly from the first and second side walls 52 and 54, for supporting thereon the plate 10, and (4) first and second stoppers 44 and 46, each extending downward from the first and second ceilings 60 and 62, for supporting the plate 10 at a predetermined position in the longitudinal direction of the plate 10. With this configuration of the receiving portion 18, the plate 10 is mounted on an inner surface of the first and second ceilings 60 and 62 and fixed or stopped at a position such that the characters 14 of the plate 10 are exposed through the window 6. In other words, the plate 10 is received in a void space defined by the receiving portion 18.

Figure 7:
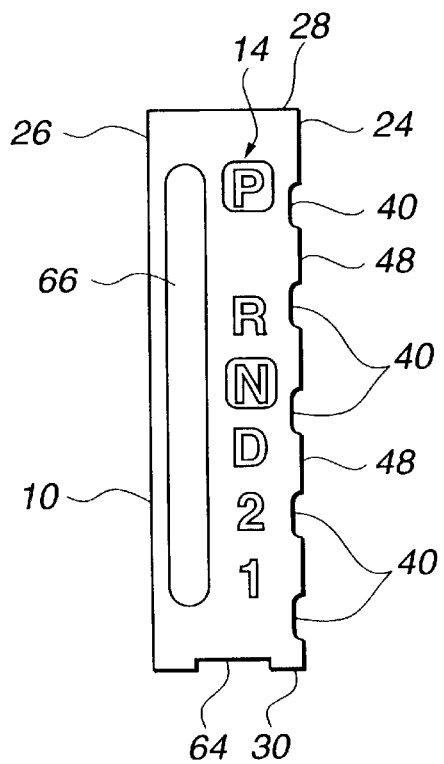
FIG. 7 is a plan view of a plate of the housing, for denoting the position of a shift lever.

As is seen in FIG. 7, the plate 10 is substantially rectangular in shape and made of flexible plastic. The plate 10 has first and second major sides 24 and 26 that are opposed to each other and are each substantially in parallel with the direction of movement of the shift lever (not shown) when the plate 10 is received in the receiving portion 18. The plate 10 further has third and fourth minor sides 28 and 30 that are opposed to each other, substantially the same in length and perpendicular to the first and second major sides 24 and 26.

The first supporting portion 20, which is arranged on a first side 32 of the receiving portion 18, is provided for supporting thereon the first major side 24 of the plate 10 (see FIG. 5). The first supporting portion 20 is formed of a plurality of first projections 20.

In the direction along the arrangement of the first projections 20, the plate 10 is put or stopped between the first and second stoppers 44 and 46. Each of the first and second stoppers 44 and 46 is in an abutment against each of the third and fourth minor sides 28 and 30 of the plate 10.

As shown in FIG. 1, there are provided a plurality of through openings 16 formed through a part of the ceiling of the housing 2 to be arranged between the window 6 and the opening 12. The through openings 16 act as index of positions of the automatic shift lever (not shown), which positions are at "P", "R", "N", "D", "2" and "1". There is provided an illumination unit (not shown) which is connected to a lower portion of the housing 2 on the side of the window 6. This illumination unit (not shown) has a light source for illuminating the through openings 16 and characters 14 of the plate 10.

Figure 2:
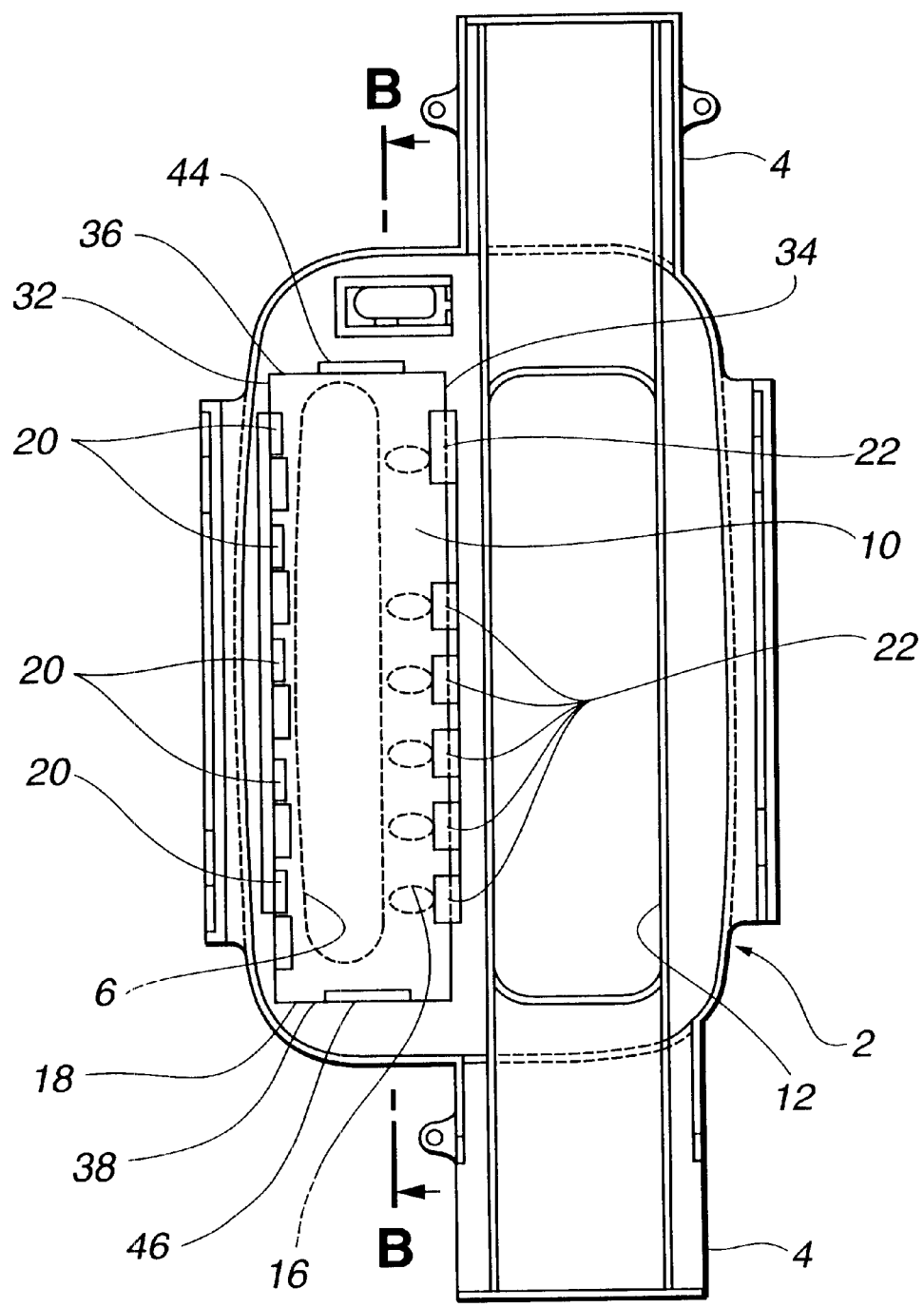
FIG. 2 is a reverse side view of the housing, which is illustrative of the inner surface of the housing.
Figure 3:
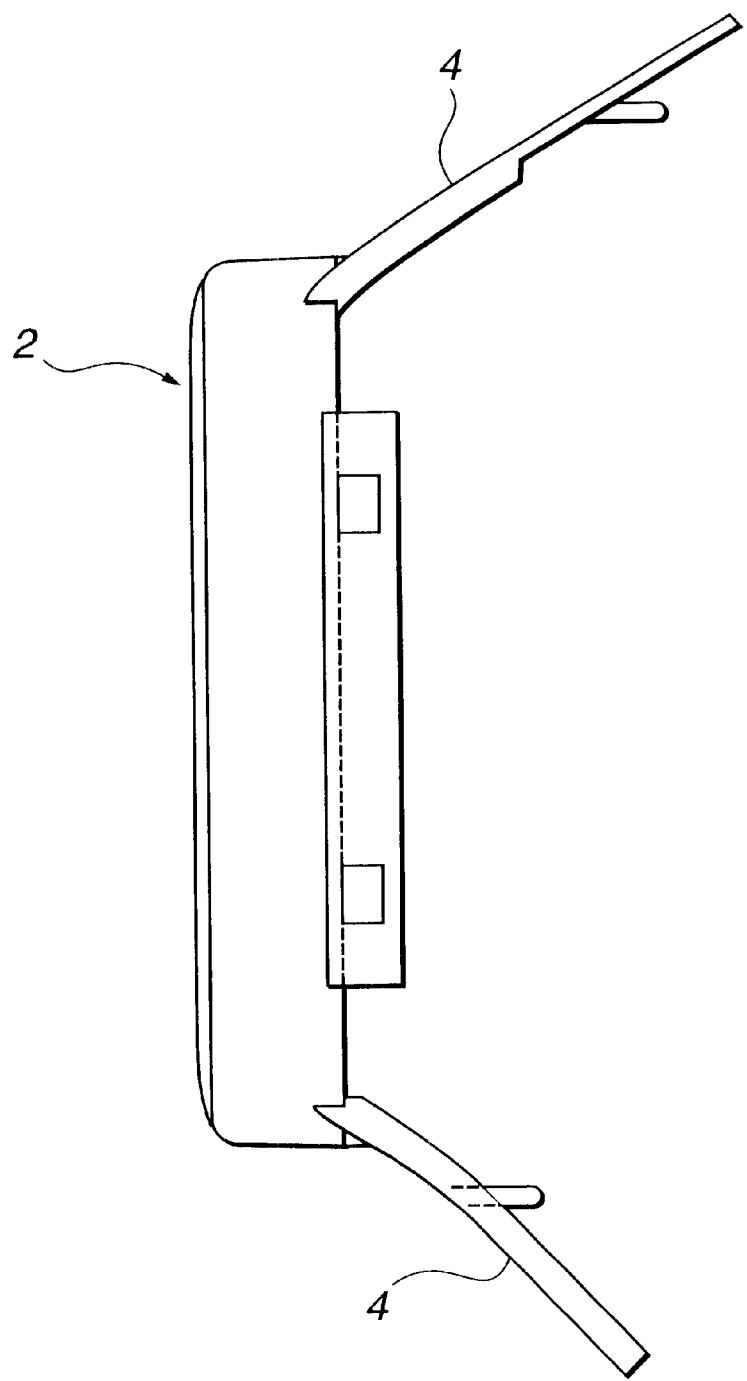
FIG. 3 is a side view of the housing.
Figure 4:
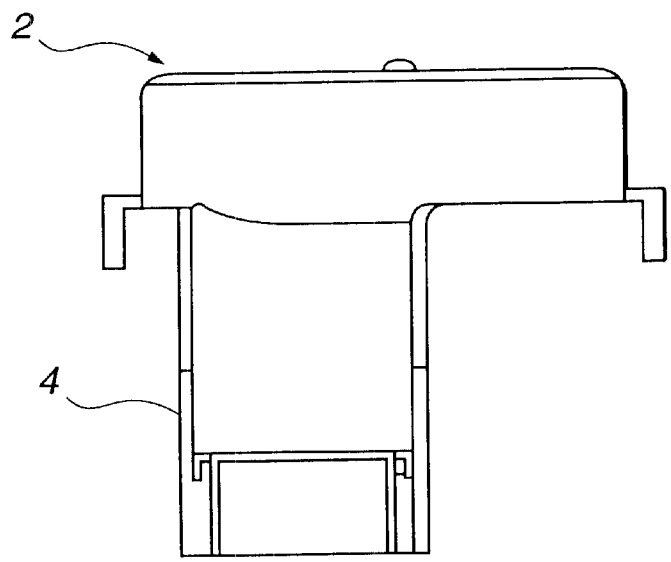
FIG. 4 is a front elevational view of the housing.

As is seen in FIG. 2, the second supporting portion 22 of the receiving portion 18 may be formed of a plurality of second projections 22, which are arranged in succession on the second side 34 of the receiving portion 18. As is seen in FIG. 2, there are defined a third side 36 and a fourth side 38 of the receiving portion 18, each of which is substantially perpendicular to and shorter than the first side 32 and the second side 34 of the receiving portion 18. Moreover, as is seen in FIGS. 5 and 6, the first and second projections 20 and 22 are projectively formed on the first and second side walls 52 and 54 respectively in such a manner that a thickness "T" can be secured between (a) the first and second ceilings 60 and 62 of the receiving portion 18—or a "bottom face" of the window 6—and (b) the first and second projections 20 and 22, in order to snugly receive the plate 10 therebetween. Each of the first and second projections 20 and 22 extends from the first or second side wall 52 or 54 to have a predetermined length in the horizontal direction such that the plate 10 is assuredly supported on the first and second projections 20 and 22. Though FIGS. 1 and 2 show the first and second projections 20 and 22 that are rectangular in shape, the first and second projections 20 and 22 may be triangular or semicircular. As an alternative to the second projections 22, the second supporting portion 22 may be formed of a single plate-like member that is elongate in shape in order to sufficiently support the second major side 26 of the plate 10. It is preferable that the first and second side walls 52 and 54 are spaced from each other such that the plate 10 is snugly received between the first and second side walls 52 and 54. In other words, the plate 10 is stopped at a predetermined position in the transverse direction of the plate 10 by the first and second side walls 52 and 54.

As is seen in FIG. 7, the plate 10 has on the first major side 24 thereof a plurality of first cut-outs 40 which are arranged at substantially regular intervals. In an assembly of the housing 2 to mount the plate 10 thereon, the first cut-outs 40 are occupied by the first projections 20. The first cut-outs 40 are substantially the same in shape as the first projections 20. Each first cut-out 40 has a size relative to the corresponding first projection 20 of the receiving portion 18 such that at least a part of each first cut-out 40 is allowed to be occupied by at least a part of the corresponding first projection 20 when the first major side 24 of the plate 10 is mated with the first side 32 of the receiving portion 18 in order to bring the plate 10 into the receiving portion 18. The plate 10 has on the fourth minor side 30 thereof a special cut-out 64 which is engaged with the second stopper 46. In case the second projections 22 are formed, in addition to the first projections 20, on the second side 34 of the receiving portion 18, second cut-outs (not shown) may also be formed on the second major side 26 of the plate 10. Similar to the first cut-outs 40 of the plate 10, each second cut-out (not shown) has a size relative to the corresponding second projection 22 of the receiving portion 18 such that at least a part of each second cut-out (not shown) is allowed to be occupied by at least a part of the corresponding second projection 22 when the second major side 26 of the plate 10 is mated with the second side 34 of the receiving portion 18 in order to bring the plate 10 into the receiving portion 18. Alongside the characters 14, there is provided a transparent portion 66 which faces the through openings 16 of the housing 2.

As shown in FIGS. 1 and 7, the plate 10 has a plurality of first protrusions 48 each being defined between adjacent two of the first cut-outs 40 of the plate 10. The first and second stoppers 44 and 46 are arranged relative to the first projections 20 of the receiving portion 18 such that the first protrusions 48 of the plate 10 are allowed to be put on the first projections 20 of the receiving portion 18 when the plate 10 is received in the receiving portion 18. With this, the first major side 24 of the plate 10 can assuredly be supported by the first projections 20. When the second cut-outs (not shown) are arranged on the second major side 26 of the plate 10, there are provided a plurality of second protrusions (not shown) similar to the first protrusions 48. Each second protrusion (not shown) is defined between adjacent two of the second cut-outs (not shown). The first and second stoppers 44 and 46 are arranged relative to the second projections 22 of the receiving portion 18 such that the second protrusions (not shown) of the plate 10 are allowed to be put on the second projections 22 of the receiving portion 18 when the plate 10 is received in the receiving portion 18.

Stated hereinafter referring to FIGS. 2 and 7 are two cases of procedures for mounting the plate 10 on the housing 2:

In the first case, only the first projections 20 are formed on the first side 32 of the receiving portion 18, and likewise only the first cut-outs 40 are formed on the first major side 24 of the plate 10. In other words, the second supporting portion 22 of the receiving portion 18 is a single plate-like member, and the second major side 26 of the plate 10 is straight in shape. At first, only the second major side 26 of the plate 10 is obliquely inserted into a space defined between the second supporting portion 22 and the second ceiling 62 from an inner space of the housing 2 (see FIG. 5). This engagement is carried out from the internal face of the housing 2. Then, while the second major side 26 of the plate 10 is kept inserted in this space, the plate 10 is moved toward the first ceiling 60, in a manner that each first projection 20 of the receiving portion 18 passes through the corresponding first cut-out 40 of the plate 10, until the plate 10 is in abutment against the first and second ceilings 60 and 62. Then, the plate 10 is moved in a sliding manner in the direction in parallel with the first side 32 of the receiving portion 18 to such an extent that the third and fourth minor sides 28 and 30 of the plate 10 are respectively brought into abutment against the first and second stoppers 44 and 46.

With this, the first protrusions 48 of the plate 10 are placed on the first projections 20 of the receiving portion 18. In fact, the special cut-out 64 which is formed on the fourth minor side 30 of the plate 10 is brought into engagement with the second stopper 46 by the sliding movement of the plate 10. Thus, the plate 10 is fixedly held in the receiving portion 18.

In the second case, the first and second projections 20 and 22 are respectively formed on the first and second sides 32 and 34 of the receiving portion 18, and likewise the first cut-outs 40 and second cut-outs (not shown) are respectively formed on the first and second sides 24 and 26 of the plate 10. At first, the plate 10 is moved toward the first and second ceilings 60 and 62 from the inner space of the housing 2, in a manner that each first projection 20 of the receiving portion 18 passes through the corresponding first cut-out 40 of the plate 10 and that each second projection 22 of the receiving portion 18 passes through the corresponding second cut-out (not shown) of the plate 10, until the plate 10 is in abutment against the first and second ceilings 60 and 62. Then, the plate 10 is moved in a sliding manner in the direction in parallel with each of the first and second sides 32 and 34 of the receiving portion 18 to such an extent that the third and fourth minor sides 28 and 30 of the plate 10 are respectively brought into an abutment against the first and second stoppers 44 and 46. With this, the first protrusions 48 and second protrusions (not shown) of the plate 10 are respectively put on the first and second projections 20 and 22 of the receiving portion 18. Thus, the plate 10 is fixedly held in the receiving portion 18.

Summarizing above, the plate 10 can be easily mounted on the housing 2. The special cut-out 64 of the plate 10 helps facilitate positioning of the plate 10 during the mounting of the plate 10 on the housing 2.

What is claimed is:

1. A housing of a vehicular shift lever, comprising:

a) a plate having characters for denoting position of said vehicular shift lever, said plate having a first side that is substantially in parallel with a direction of movement of said vehicular shift lever, and a second side opposed to said first side of said plate, said second side of said plate being straight in shape;

b) a receiving portion for receiving therein said plate, said receiving portion being configured such that, when said plate is received in said receiving portion, said plate is mounted on an inner surface of said housing;

c) a first supporting portion for supporting thereon said first side of said plate, said first supporting portion being formed of a plurality of first projections arranged on a first side of said receiving portion, said first side of said receiving portion being substantially in parallel with said direction of movement of said vehicular shift lever; and d) a second supporting portion for supporting thereon said second side of said plate, said second supporting portion being formed on a second side of said receiving portion opposed to said first side of said receiving portion, said second supporting portion of said receiving portion being a single plate-like member;

wherein said plate has on said first side thereof a plurality of first cut-outs, each first cut-out having a size relative to a respective one of said first projections of said receiving portion such that at least a part of each first cut-out is allowed to be occupied by at least a part of said respective one of said first projections when each first cut-out is mated with said respective one of said first projections in order to bring said plate into said receiving portion.

2. A housing according to claim 1, wherein said plate is substantially rectangular in shape and has a third side that is shorter in length than each of said first and second sides of said plate, and wherein said receiving portion has a first stopper that is in abutment against said third side of said plate when said plate is received in said receiving portion.

3. A housing according to claim 2, wherein said plate has a fourth side that is opposed to and substantially equal in length to said third side of said plate, and wherein said receiving portion has a second stopper that is in abutment against said fourth side of said plate when said plate is received in said receiving portion.

4. A housing according to claim 3, wherein said plate has a plurality of first protrusions each being defined between adjacent two of said first cut-outs of said plate, and wherein said first stopper and second stopper are arranged relative to said first projections of said receiving portion such that said first protrusions of said plate are allowed to be put on said first projections of said receiving portion when said plate is received in said receiving portion.

5. A housing according to claim 1, wherein said receiving portion has a first ceiling which is positioned above and spaced from said first projections of said receiving portion such that said first side of said plate is snugly received between said first ceiling and said first projections.

6. A housing according to claim 1, wherein said receiving portion has a second ceiling which is positioned above and spaced from said second supporting portion of said receiving portion such that said second side of said plate is snugly received between said second ceiling and said second supporting portion.

7. A housing according to claim 1, wherein said receiving portion further has on said first and second sides thereof first and second side walls respectively which are spaced from each other such that said plate is snugly received between said first and second side walls.

* * * * *